United States Patent [19]

Yamamoto

[11] Patent Number: 4,852,150
[45] Date of Patent: Jul. 25, 1989

[54] AUTOMATIC TELEPHONE ANSWERING SYSTEM USING A SINGLE SINGLE-TONE SIGNAL FOR VARIOUS OPERATIONS

[75] Inventor: Tadashi Yamamoto, Chiba, Japan

[73] Assignee: Sony Corporation, Tokyo, Japan

[21] Appl. No.: 900,847

[22] Filed: Aug. 27, 1986

[30] Foreign Application Priority Data

Aug. 31, 1985 [JP] Japan .............................. 60-192456

[51] Int. Cl.[4] ............................................. H04M 1/65
[52] U.S. Cl. .......................................... 379/79; 379/70
[58] Field of Search ................... 379/70, 77, 74, 97

[56] References Cited

U.S. PATENT DOCUMENTS

| | | | |
|---|---|---|---|
| 3,381,276 | 4/1968 | James ..................................... | 379/97 |
| 3,730,997 | 5/1973 | Konno .................................... | 379/77 |
| 3,943,292 | 3/1976 | Takazawa .............................. | 379/79 |
| 4,500,753 | 2/1985 | Plunkett, Jr. .......................... | 379/70 |

OTHER PUBLICATIONS

*Star Telephone Answering and Recording Set,* by Edward A. Marheine GTE Technical Journal, vol. 13, No. 3 Jul. 1972 pp. 106–109.

*Solid State Radio Engineering,* Krauss and Bostian, p. 179 © 1980.

*Primary Examiner*—Alan Faber
*Assistant Examiner*—James E. Tomassini
*Attorney, Agent, or Firm*—Lewis H. Eslinger; Jay H. Maioli

[57] ABSTRACT

In an automatic telephone answering system which records and reproduces an outgoing message to be sent to a calling party and an incoming message from the calling party on a recording medium, such as magnetic tape, a single-tone test signal from a touch tone signal generator is recorded on the tape as a cue signal to indicate a position of one of the incoming and outgoing messages. The single-tone signal is also used for a variety of signals in the operation of the automatic telephone answering system, such as a beep tone, an instruction signal and an alarm signal. The reproduced cue signal which is within an audio band is discriminated from an audio signal representing the outgoing or incoming message by a phase-locked loop having a narrow capture range and a loop filter with a prolonged time constant.

8 Claims, 1 Drawing Sheet

AUTOMATIC TELEPHONE ANSWERING SYSTEM USING A SINGLE SINGLE-TONE SIGNAL FOR VARIOUS OPERATIONS

FIELD OF THE INVENTION

The present invention relates to an automatic telephone answering system which combines a telephone set and an automatic telephone answering apparatus having a recording/reproducing device which can reproduce and send to a calling party an OGM (Outgoing Message) pre-recorded on a recording medium, can record on the recording medium an ICM (Incoming Message) from the calling party, and can reproduce the recorded ICM at a later time.

BACKGROUND OF THE INVENTION

In conventional automatic telephone answering apparatus, an OGM which instructs the start of automatic recording to a calling party is recorded on a recording medium (for example, a magnetic tape) in advance. Upon reception of an incoming call, first the OGM is reproduced to be sent to the calling party over the telephone line and, thereafter, an ICM from the calling party can be recorded on the magnetic tape. There are two types of automatic telephone answering apparatus, a first type in which the OGM and the ICM are recorded using a single magnetic tape as the recording medium, and a second type in which the OGM and the ICM are recorded on different magnetic tapes. In either type of apparatus, upon recording and reproducing of the OGM and the ICM, position detection of the magnetic tape, that is, a search for the beginning, an intermediate division and the end of the OGM and/or the ICM, must be performed. For this purpose, a position detection system is employed in which a cue signal is recorded at a predetermined position on the magnetic tape and is reproduced to indicate the respective position.

However, in order to produce the cue signal, prior art apparatus required an exclusive-use cue signal oscillator. In addition, individual signal oscillators were required for producing various sound signals, for example, a beep tone signal for notifying a calling party and a user of the operational state, an operational step, or an operation instruction; a reception sound signal of a key operation, which is produced upon a satisfactory operation of an operation key on a keyboard; an alarm signal which is produced upon malfunction or erroneous operation; and the like. In the case of a push-button or touch tone type telephone set, a touch tone signal is sent onto a telephone line upon input of a desired telephone number by actuation of the respective keys of a keyboard. A touch tone signal oscillator is also required for generating the touch tone signal. Therefore, in the system combining the above-described telephone set and automatic telephone answering apparatus, a plurality of signal oscillators must be provided.

Moreover, the oscillator for providing a cue signal must have a very stable frequency which is not easily influenced by an audio signal. If such an oscillator is not adopted, high precision is required for the characteristics of a cue signal detection circuit. Otherwise the cue signal may not be discriminated from the audio signal and would be easily influenced by induction noise, e.g., humming.

OBJECTS AND SUMMARY OF THE INVENTION

It is an object of the present invention to provide an automatic telephone answering system in which a cue signal used as a position detection signal, a beep tone signal, a key-operation reception signal, an alarm signal for an automatic telephone answering apparatus and a dialing signal for a telephone set to be sent onto a telephone line are all produced from a common signal oscillator, and in which various special purpose signals all having a stable frequency can be obtained.

It is another object of the present invention to provide an automatic telephone answering system in which a phase-locked loop (PLL) circuit is used as a detection circuit for a position detection signal, and the PLL circuit has a narrow frequency capture range and a prolonged period for lock-in, so that the cue signal used as a position detection signal can be simply and reliably discriminated from an audio signal.

In accordance with the present invention, an automatic telephone answering system for recording and reproducing an OGM (Outgoing Message) to be sent to a calling party and/or an ICM (Incoming Message) from the calling party on and from a recording medium in response to an incoming call from the party comprises telephone number setting means operable to place a call to a telephone set identified by a respective telephone number, signal generator means for generating a plurality of first signals having respective predetermined frequencies for transmission over a telephone line in accordance with the operation of the telephone number setting means, and recording means for recording a second signal having a selected one of the frequencies generated by the signal generator means as a position detection signal on the recording medium for indicating the position of a selected one of the OGM and ICM also recorded as audio signals on the recording medium.

DESCRIPTION OF THE PREFERRED EMBODIMENT

Figure 1:
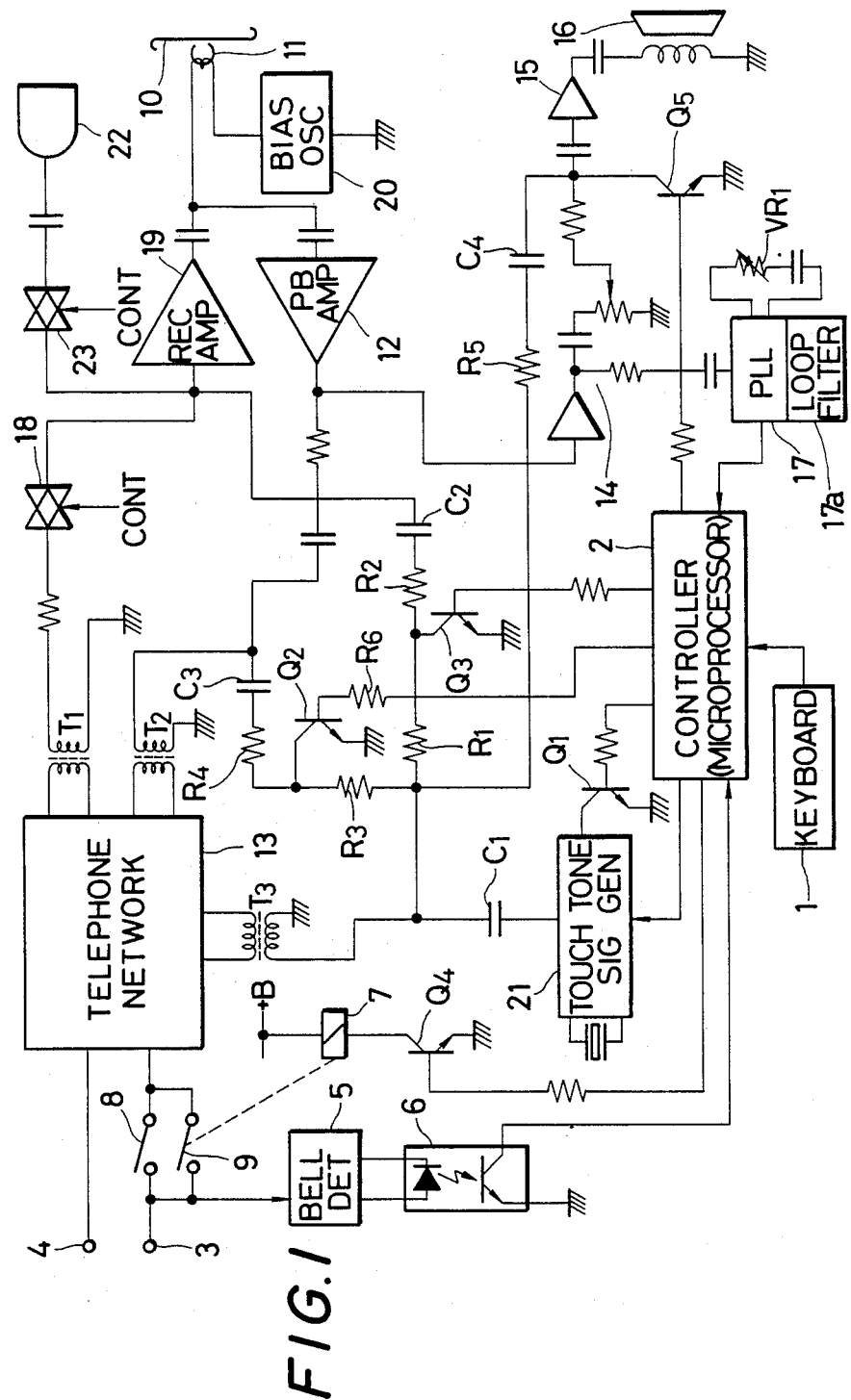
FIG. 1 is a circuit diagram of a preferred embodiment of the present invention.

The present invention is preferably applied to an automatic telephone answering system in which a push-button telephone set and a tape recorder unit are arranged integrally in a single casing.

As is well known, in a push-button type telephone set, when selected keys of the ten-key keyboard are depressed to call a desired telephone number, a DTMF (Dual Tone Multi-Frequency) signal (that is, a so-called touch tone signal) having frequencies which are combined in accordance with desired the telephone number are sent onto a telephone line. Specifically, the touch tone signal generator provides the touch tone signals by combining two signals from among seven signals having different frequencies and sends them onto the telephone line. In addition to these signals, a single-tone signal used in a test mode and a control signal having a different predetermined frequency are provided by the touch tone signal generator.

An automatic telephone answering apparatus requires various sound signals, for example, a beep tone signal to be sent to a calling party and a user, a key-operation reception sound signal for notifying the user of the reception of a key operation, an alarm signal for signaling a malfunction or an erroneous operation and a cue signal. As noted above, the cue signal is recorded on magnetic tape to indicate and allow detection of a tape position, for example, the beginning, an intermediate division and the end of an OGM and an ICM, when the OGM and ICM are recorded and reproduced. The beep tone signal is used to notify a calling party of the operational state of the automatic telephone answering apparatus or for instructing the next operation.

Generally, in apparatus according to the present invention, the single-tone signal, for example, having a frequency of 1,666 Hz, which is used in the test mode and is obtained from the touch tone signal generator, is also used as the cue signal, the beep tone signal, the key-operation reception sound signal and the alarm signal. The cue signal is recorded on the magnetic tape in an audio track together with audio signals constituting the OGM and ICM. Since the frequency, 1,666 Hz, of the single-tone signal is included in the audio band, it cannot be directly detected as the cue signal. However, further n accordance with the present invention, a phase-locked loop (PLL) circuit which phase-locks at the frequency of 1,666 Hz is used as a cue signal detection circuit having band-pass filter characteristics. In this case, in order to discriminate the cue signal from the audio signals, the capture range of the PLL circuit is narrowed and the time constant of a loop filter in the PLL circuit is prolonged so that the PLL circuit requires a long time to reach phase-lock. If the audio signal being reproduced includes a 1,666 Hz component, the expected duration will be much shorter than the duration of the cue signal. Therefore, if the time constant is prolonged, phase-lock in response to the audio signal will not occur, thus preventing erroneous detection.

The cue signal detected by the PLL circuit must have a very stable frequency with, for example, 1 to 2% error, since the capture range of the PLL circuit is narrow. For this reason, a conventional RC oscillator cannot satisfy the above requirement due to the usual tolerances in the precision of its parts, temperature characteristics, variations in adjustment, and the like. However, the precision of the touch tone signal generator depends on that of a crystal oscillator, and it normally falls within 0.3% error. Even if variations in temperature characteristics and voltage must be considered, the precision still falls within 1.5% error. In addition, since the touch tone signal generator can produce a good sinusoidal output waveform, detection can be simplified and precise.

Referring now to FIG. 1, an embodiment of the present invention is there illustrated which records and reproduces the cue signal, and sends the cue signal as well as the beep tone signal, the key-operation reception sound signal, and the alarm signal onto a telephone line.

In the circuit of FIG. 1, circuits, switches, transistors, and the like provided therein are operated at predetermined times and intervals by a controller 2, incorporating a microprocessor, in response to command signals entered by operation of a keyboard 1. Controller 2 is also responsive to a bell signal indicating an incoming call and supplied through a bell detector 5 and a photocoupler 6, as well as to a position detection signal from a phase-locked loop 17 generated upon the reproduction of a cue signal, as will be discussed in more detail below. Generally, the circuitry controlled by controller 2 may be divided into blocks associated with a telephone network 13, a tape recorder for recording on and reproducing from a tape 10, a touch tone signal generator 21 and a loudspeaker 16. Importantly, one of the signals produced by touch-tone signal generator 21 is a single-tone signal used as a test signal and having a frequency, in the present embodiment, of 1666 Hz. It is this single-tone signal which is used in accordance with the present invention as the cue signal, beep signal, key operation signal and alarm signal, as will be discussed in greater detail below. Each of these individual elements are conventional, but are connected through specifically defined circuitry to be operated in a novel and unconventional manner by controller 2 to achieve highly advantageous results, as will be discussed below.

Terminals 3 and 4 are provided for connecting the telephone set to an external telephone network line through a conventional jack or plug. Telephone network 13 operates in a well known manner to convert the internal signals within the telephone set into an appropriate line signal for transmission over the telephone line. When a bell signal from the telephone line is received while the system is in the automatic answering mode, it is detected by a bell detector 5. A detection signal generated thereupon is supplied to controller 2 through photocoupler 6. Controller 2 turns on a transistor $Q_4$ in response to the detection signal from bell detector 5 to energize a relay 7, thereby closing contacts 8 and 9. This initiates playback of a pre-recorded OGM by the tape player, which includes a recording/reproducing head 11, playback (PB) amplifier 12, recording (REC) amplifier 19 and a bias oscillator 20, forming a conventional tape player. The OGM may be recorded by the user during a message recording mode of the telephone answering apparatus by speaking the message into a microphone 22. The audio signal therefrom is supplied through an analog switch 23 to recording amplifier 19 to head 11 to be recorded on tape 10.

In a manner described in detail below, a cue signal generated from touch tone signal generator 21 is recorded after the OGM and serves as an OGM end mark. The pre-recorded OGM is played back by head 11 from tape 10, and is sent to terminal 3, and thence to the calling party, through a playback (PB) amplifier 12, a transformer $T_2$, telephone network 13 and relay contact 8.

Immediately after playback of the OGM, the previously recorded 1,666 Hz cue signal is reproduced from tape 10. The reproduced cue signal is supplied to PLL circuit 17 from PB amplifier 12 through a low-pass filter 14. PLL circuit 17 is preset to have a narrow frequency capture range around a lock frequency of 1,666 Hz by a variable resistor $VR_1$ and includes a loop filter 17a with a prolonged time constant.

As stated above, any audio signal component within the OGM, or the ICM to be discussed below, is expected to have a duration considerably shorter than that of the cue signal, which can last for up to approximately one second. It is therefore extremely unlikely that any part of the OGM or IGM will contain a signal close enough to the lock frequency and enduring for a sufficiently long time to cause PLL circuit 17 to lock. Conversely, the cue signal generated from touch tone signal generator 21 has a highly stable frequency at 1666 Hz and endures for a sufficiently long time to be accurately and surely discriminated by PLL circuit 17 as a position detection signal.

When PLL circuit 17 so identifies the reproduced cue signal and locks, it supplies a signal to controller 2. Controller 2 then outputs a signal to turn on a transistor $Q_1$, thereby actuating touch tone signal generator 21. Touch-tone signal generator 21 thereupon produces the 1,666 Hz single-tone signal, which is now sent as a beep tone signal for notifying the calling party of the end of the OGM playback and the start of the ICM recording. The beep tone is,.recognizable by the calling party/as the conventional tone after which the calling party can leave a message. Thus, the single-tone signal is used not only as the cue signal, but also as the beep tone and as other signals described below. This reduces the complexity and cost of the circuit by reducing the number of oscillators and furthermore ensures that the signals have a highly stable frequency. When used as a beep tone, the single-tone signal is transmitted over a path defined by capacitor $C_1$, resistors $R_3$ and $R_4$, a capacitor $C_3$, transformer $T_2$, to telephone network 13 and out through line terminal 3. A muting transistor $Q_2$ connected to the node between the resistors $R_3$ and $R_4$ is turn off at this time to allow the beep tone to pass. When muting transistor $Q_2$ is off, a signal can pass through this node, while when muting transistor $Q_2$ is on, the signal is diverted to ground. As described below, various muting transistors operating in this manner are provided throughout the circuit of FIG. 1 to mute the single-tone signal when appropriate to prevent its transmission to different parts of the circuit at different times. Thus, when the single-tone signal is generated at a time when transmission of a beep tone is unnecessary, muting transistor $Q_2$ will be turned on by controller 2.

Having received the signal from PLL circuit 17 that the cue signal indicating the end of the OGM has been reached and therefore that the reproducing operation is over, controller 2 sets an ICM recording mode. Any ICM signal received from the calling party after the beep tone is supplied to head 11 through terminal 3, switch 8, telephone network 13, a transformer $T_1$, an analog switch 18, and REC amplifier 19 so as to be recorded on tape 10 as an audio signal on an audio track. At the same time, head 11 receives a bias signal from a bias oscillator 20 to be activated for recording.

When controller 2 detects that the telephone line to the calling party has been disconnected or that a preset ICM recording interval (e.g. 60 seconds) has passed, the ICM recording operation is complete, and a cue signal indicating the end of the ICM is recorded. To this end, transistor $Q_1$ is turned on and touch tone signal generator 21 is actuated again. The single-tone signal generated from touch tone signal generator 21 is to head 11 through capacitor $C_1$, resistors $R_1$ and $R_2$, capacitor $C_2$, and REC amplifier 19. The single-tone signal is recorded on the same track as the ICM as the cue signal for indicating the ICM end position and endures for a predetermination duration after the end of the ICM. At this time, a muting transistor $Q_3$ connected to the node between the $R_1$ and $R_2$ is turned off by controller 2 to allow the signal to pass. If the calling party continues to talk until the ICM recording interval has passed, controller 2 does not receive a disconnect signal and therefore again turns on transistor $Q_1$ to actuate touch tone signal generator 21 to output the single-tone signal as the beep tone for notifying the calling party of the end of the ICM recording interval. Again, muting transistor $Q_3$ is turned off for this purpose.

It is noted that during the initial recording of the OGM by the telephone set user, a cue signal indicating the end of the OGM is recorded on tape 10 in the audio track in exactly the same manner as the cue signal is recorded to indicate the end of the ICM. Thus, all the cue signals recorded on tape 10 will have the highly stable frequency of a signal from a touch tone oscillator and the required duration so as to be surely and reliably detected by PLL circuit 17.

When, at a later time, the ICM recorded on tape 10 is to be played back, controller 2 sets the playback mode previously set to play back OGM in response to a command entered on keyboard 1. The reproduced as an audio signal by head 11 is supplied to loudspeaker 16 through PB amplifier 12, low-pass 14, and a main amplifier 15. At the end of the ICM, he reproduces the cue signal as the ICM end marker. This reproduced cue signal is supplied to PLL circuit 17 through PB amplifier 12 and low-pass filter 14. When PLL circuit 17 locks in response thereto, controller 2 turns on transistor $Q_1$, thereby supplying the single-tone signal from touch tone signal generator 21 as the beep tone to loudspeaker 16 through main amplifier 15 via capacitor $C_1$, resistor $R_5$, and a capacitor $C_4$. In this case, a muting transistor $Q_5$ connected to the input of amplifier 15 is turned off.

If an erroneous setting or operation by a user during the OGM recording mode or the ICM playback mode occurs, or if a malfunction inside the system is detected, controller 2 turns on transistor $Q_1$ to actuate touch-tone signal generator 21. Then, the single-tone signal is supplied as an alarm signal to loudspeaker 16 from main amplifier 15 via capacitor $C_1$, resistor $R_5$, and capacitor $C_4$. The alarm signal can also be sent to the calling party from terminal 3 via capacitor $C_1$, resistor $R_3$ and $R_4$, capacitor $C_3$ transformer $T_2$, and telephone network 13, if necessary.

When the user sets the OGM recording mode, the ICM playback mode, or the like, or enters a telephone number by operating the keys on keyboard 1, controller 2 enables transistor $Q_1$ to produce the single-tone signal as a key-operation reception sound signal from signal generator 21 to notify to the user that the system has accepted the key operation on the keyboard 1. The key-operation reception sound signal is supplied to loudspeaker 16 through capacitor $C_1$, resistor $R_5$, capacitor $C_4$, and main amplifier 15, with muting transistor $Q_5$ being turned off for this purpose. As described above, the muting transistors $Q_2$, $Q_3$, and $Q_5$ are all controlled by controller 2 at respective times so that the cue signal, the beep tone signal, and the key-operation reception sound signal will not be supplied to an inappropriate part of the telephone set.

In the case of dial calling, touch tone signal generator 21 produces a dial signal having a frequency as a combination of two predetermined frequency signals in accordance with the actuation of the respective keys on keyboard 1. The dial signal is then sent from terminal 3 through capacitor $C_1$, a transformer $T_3$, and telephone network 13.

As described above, when an OGM is recorded, an audio signal (the user's voice) obtained through microphone 22 is supplied to head 11 through analog switch 23 and REC amplifier 19 to be recorded on tape 10. In the above embodiment, the OGM and the ICM are both recorded on the single tape 10. However, the OGM and the ICM can be recorded on different tapes.

In accordance with the present invention, since the cue signal, the beep tone signal, the key-operation reception sound signal, the alarm signal and the dial signal are all produced by a single touch tone signal generator, these signals have a highly stable frequency. The use of a single oscillator also simplifies the circuitry considerably. Furthermore, since the capture range of the PLL circuit is narrowed and the time constant of the loop filter in the PLL circuit is prolonged, the cue signal can be easily and reliably discriminated from the audio signal, even through it is recorded on the same audio track as the OGM and the ICM.

Although various embodiments of the present invention have been discussed herein, those skilled in the art will recognize other modifications and embodiments of the present invention that can be made without departing from the spirit of the present invention. Therefore, the spirit and scope of the present invention are intended to be defined solely by the appended claims.

What is claimed is:

1. An automatic telephone answering system for recording and reproducing an outgoing message to a calling party and/or an incoming message from the calling party on and from a recording medium in response to an incoming call from the calling party, said system comprising:

telephone number setting means operable to place a call to a telephone set identified by a respective telephone number;

a dual-tone multi-frequency signal generator for generating a plurality of first signals having respective predetermined frequencies for transmission over a telephone line in accordance with the operation of said telephone number setting means and a second signal having a selected one of said predetermined frequencies;

recording means for recording said second signal on a desired position of the recording medium as a position detection signal for indicating a position of a selected one of said outgoing message and said incoming message also recorded as audio signals on said recording medium;

means for reproducing signals recorded on said recording medium;

position detection signal discriminating means having band pass filter characteristics for discriminating a reproduced position detection signal having said selected one of said predetermined frequencies from an audio signal within said audio band also reproduced from said recording medium and constituting said outgoing or incoming message; and means for using said second signal generated by said signal generator as a beep tone signal for indicating an operating state of said system and also recording medium, said using means including means for producing said beep tone signal so that it is audible to a system user.

2. An automatic telephone answering system according to claim 1, wherein said second signal has a frequency falling within an audio band.

3. An automatic telephone answering system according to claim 1, wherein said position detection signal discriminating means includes phase-locked loop means adapted to lock at said selected frequency of said second signal.

4. An automatic telephone answering system according to claim 3, in which said phase-locked loop means has a narrow capture range about said selected frequency of said second signal and includes loop filter means having a prolonged time constant for causing said phase-locked means to lock only upon reception of a signal having a frequency within said narrow capture range and persisting for a predetermined period of time greater than an expected duration of an audio signal at said frequency of said second signal.

5. An automatic telephone answering system according to claim 1, wherein said means for using said second signal generated by said signal generator includes means for providing instructions for an operation of said system using said beep tone signal.

6. An automatic telephone answering system according to claim 1, wherein said means for using said second signal generated by said signal generator includes means for using said beep tone signal as a key operation reception signal generated upon operation of an operation key provided in said system.

7. An automatic telephone answering system according to claim 1, wherein said means for using said second signal generated by said signal generator includes means for using said beep tone signal as an alarm signal generated when malfunction or erroneous operation of said system occurs.

8. An automatic telephone answering system according to claim 1, wherein said second signal is a single-tone signal having a frequency of 1,666 Hz.

* * * * *